3,152,160
AMINE SALTS OF HEXAFLUOROARSENIC AND HEXAFLUOROPHOSPHORIC ACIDS
Hugh T. Harrison, Midland, Mich., assignor to The Dow Chemical Company, Midland, Mich., a corporation of Delaware
No Drawing. Filed June 4, 1962, Ser. No. 199,627
6 Claims. (Cl. 260—440)

The present invention is concerned with monosalts of hexafluoroarsenic or hexafluorophosphoric acid and tri-n-pentylamine, triisopentylamine, cyclohexylamine, or dicyclohexylamine having the following formulae, respectively, $$(CH_3-CH_2-CH_2-CH_2-CH_2-)_3N$$

and $$(CH_3-CH-CH_2-CH_2-)_3N$$
$$\qquad\ |$$
$$\qquad CH_3$$

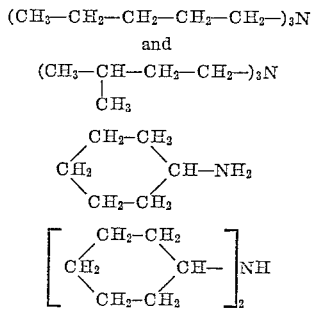

The present compounds are waxy or crystalline solid materials of low to moderate solubility in organic compounds and of low solubility in water. They are useful as parasiticides and are adapted to be employed in the control of insects, nematodes, helminths, fungi, California red scale, round worms, and *Musca domestica* (house fly).

The compounds of the present invention are prepared by the reaction of hexafluoroarsenic or hexafluorophosphoric acid with the tri-n-pentylamine, triisopentylamine, cyclohexylamine, or dicyclohexylamine. Conveniently, the reaction is carried out in an inert solvent as reaction medium. Suitable solvents include benzene, methanol, ethanol and water. Good results are obtained when substantially equimolecular proportions of the reactants are employed. The reaction is exothermic and takes place smoothly at temperatures of from −10° to 80° C. with the production in the reaction mixture of the desired product.

In carrying out the reaction, the hexafluoroarsenic or hexafluorophosphoric acid is contacted with the amine compound in any conventional manner. The contacting is conveniently carried out by adding one reactant to the other reactant. Oftentimes it is convenient to employ a hydrate form of the acid reactant. The temperature of the resulting reaction mixture can be controlled by regulating the rate of the contacting of the reactants as well as by external cooling. Sometimes the desired product precipitates in the mixture during the reaction. Where desirable to maintain fluid condition such product can be separated in part from fluid portions of the mixture by conventional procedures. Upon completion of the contacting of the reactants, most of the reaction will have taken place with the production of the desired product. Where optimum yields are desired, it is often convenient that the reaction mixture be allowed to stand several hours or longer to insure substantial completion of reaction. Upon completion of the reaction, the solvent can be removed from the reaction mixture by evaporation or distillation under reduced pressure to obtain the salt product as a residue. This product can be purified by conventional procedures such as washing with water or suitable organic liquid and recrystallization.

*Example 1.—Tri-n-Pentylamine Hexafluoroarsenate*

45 grams of tri-n-pentylamine (0.20 mole) are added portionwise and with stirring to 50 grams of hexafluoroarsenic acid monohydrate (0.24 mole) dispersed in 25 milliliters of water. The addition is carried out over a period of thirty minutes and at room temperature. Upon completion of the addition, the reaction mixture is filtered to obtain the tri-n-pentylamine hexafluoroarsenate product as a residue. This product is found to be a solid material melting at from 68° to 73° C.

*Example 2.—Tri-n-Pentylamine Hexafluorophosphate*

90 grams of tri-n-pentylamine (0.40 mole) are added portionwise and with stirring to an aqueous 65 percent solution of hexafluorophosphoric acid (equivalent to 0.44 mole of $HPF_6$). The aqueous $HPF_6$ solution employed herein and in the following embodiments is a commercial product containing 65 percent $HPF_6$, 21 percent $H_2O$, and 14 percent of related phosphorus acids. The addition is carried out over a period of one hour and at room temperature. Upon completion of the addition, the reaction mixture is filtered to obtain the tri-n-pentylamine hexafluorophosphate product as a residue. The product is then washed with water, the washed product dried, and the dried product found to be a waxy material melting at from 63° to 65° C.

*Example 3.—Cyclohexylamine Hexafluorophosphate*

20 grams of cyclohexylamine (0.20 mole) are added portionwise and with stirring to an aqueous 65 percent solution of hexafluorophosphoric acid (equivalent to 32.5 grams; 0.22 mole of $HPF_6$). The addition is carried out at a slowly rising temperature initially near to 0° C. and over a period of thirty minutes. Upon completion of the addition, the reaction mixture is filtered to obtain the cyclohexylamine hexafluorophosphate product as a residue. This product is washed with water and the washed product dried and found to melt at from 206° to 207° C.

In a similar manner, other products of the present invention are prepared as follows:

Triisopentylamine hexafluoroarsenate (molecular weight of 417.4) by reacting together triisopentylamine and hexafluoroarsenic acid.

Dicyclohexylamine hexafluorophosphate (melting at from 294° to 296° with decomposition) by reacting together dicyclohexylamine and hexafluorophosphoric acid.

Triisopentylamine hexafluorophosphate (as a white crystalline product melting at from 113° to 116° C.) by reacting together triisopentylamine and hexafluorophosphoric acid.

Cyclohexylamine hexafluoroarsenate (melting at from 220° to 222° C.) by reacting together cyclohexylamine and hexafluoroarsenic acid.

Dicyclohexylamine hexafluoroarsenate (melting with decomposition at 295° C.) by reacting together dicyclohexylamine and hexafluoroarsenic acid.

The present compounds are useful as parasiticides. For such use, the unmodified compounds can be employed. However, the present invention also encompasses the use of the compounds together with a parasiticide adjuvant. In such use, the compounds can be dispersed upon a finely divided solid and the resulting preparations employed as dusts. Also, such mixtures can be dispersed in water with the aid of a wetting agent and the resulting aqueous suspensions employed as sprays. In other procedures, the products can be employed as constituents of organic liquid compositions, oil-in-water or water-in-oil emulsions, or water dispersions with or without the addition of wetting, dispersing or emulsifying agents. In representative operations, aqueous compositions containing 300 parts by weight of tri-n-pentylamine hexafluoroarsenate or tri-n-pentylamine hexafluorophosphate per million parts of ultimate mixture give 100 percent control of round worms. In further operations, aqueous compositions containing 500 parts by weight of cyclohexylamine hexafluorophosphate per million parts of the ultimate composition give 100 percent control of *Musca domestica*.

I claim:
1. The monosalts of a member of the group consisting of hexafluoroarsenic acid and hexafluorophosphoric acid and a member of the group consisting of tri-n-pentylamine, triisopentylamine, cyclohexylamine, and dicyclohexylamine.
2. Tri-n-pentylamine hexafluoroarsenate.
3. Tri-n-pentylamine hexafluorophosphate.
4. Cyclohexylamine hexafluorophosphate.
5. Dicyclohexylamine hexafluoroarsenate.
6. Triisopentylamine hexafluoroarsenate.

References Cited in the file of this patent
UNITED STATES PATENTS

| | | |
|---|---|---|
| 1,917,463 | Salzberg et al. | July 11, 1933 |
| 1,960,712 | Reimers | May 29, 1934 |

OTHER REFERENCES

Fluorine Chemistry, edited by J. H. Simons, Academic Press, Inc. (N.Y.) (1950), pages 138–139.